United States Patent
Shang et al.

(10) Patent No.: US 7,587,145 B2
(45) Date of Patent: Sep. 8, 2009

(54) OPTICAL RECEIVER WITH ELECTRIC TERNARY CODING

(75) Inventors: Song Quan Shang, Palo Alto, CA (US); Craig Schulz, Fremont, CA (US); Tom Mader, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 386 days.

(21) Appl. No.: 11/479,996

(22) Filed: Jun. 29, 2006

(65) Prior Publication Data

US 2008/0002985 A1    Jan. 3, 2008

(51) Int. Cl.
*H04B 10/06*    (2006.01)

(52) U.S. Cl. ........................ 398/208

(58) Field of Classification Search ............ 398/208, 398/211
See application file for complete search history.

(56) References Cited

U.S. PATENT DOCUMENTS

| | | | |
|---|---|---|---|
| 6,879,783 B1* | 4/2005 | Nakahira | 398/51 |
| 7,139,319 B2* | 11/2006 | Loheit et al. | 375/259 |
| 7,218,865 B2* | 5/2007 | Doh et al. | 398/202 |
| 2003/0223761 A1* | 12/2003 | Brown et al. | 398/183 |
| 2004/0130397 A1* | 7/2004 | Mactaggart | 330/308 |
| 2006/0018667 A1* | 1/2006 | Lee et al. | 398/186 |
| 2006/0263099 A1* | 11/2006 | Bai et al. | 398/199 |

FOREIGN PATENT DOCUMENTS

EP    000551858 A2 *  9/1993

OTHER PUBLICATIONS

"Optical Networks: A Practical Perspective", Second Edition, Morgan Kaufmann, 2001, pp. 197-199.*
G. May, et al., "Extended 10 Gb/s Fiber Transmission Distance at 1538 nm Using a Duobinary Receiver", IEEE Photonics Technology Letters, vol. 6, No. 5, May 1994 (pp. 648-650).
U.S. Appl. No. 11/323,745, filed Dec. 30, 2005, entitled "Optical Receiver With Duo-Binary Encoder", Inventor(s) Craig Schulz, et al.
R. Tao, et al., "10 Gb/s CMOS limiting amplifier for optical links", Solid-State Circuits Conference, 2003. ESSCIRC '03. Proceedings of the 29th European, Sep. 2003 (pp. 285-287).

* cited by examiner

*Primary Examiner*—Shi K Li
(74) *Attorney, Agent, or Firm*—Blakely, Sokoloff, Taylor & Zafman LLP

(57) ABSTRACT

An optical to electrical converter is to receive an incoming optical data communications signal. A binary to ternary encoder has an input coupled to an output of the converter. A ternary to binary decoder has first and second limiting amplifiers, each having a pair of complementary inputs. One of the inputs of each pair is coupled to a first adjustable threshold circuit and the other is coupled to an output of the encoder. A logical summing circuit has a pair of inputs coupled to outputs of the first and second limiting amplifiers, respectively. Other embodiments are also described and claimed.

5 Claims, 4 Drawing Sheets

OPTICAL RECEIVER WITH ELECTRIC TERNARY CODING

An embodiment of the invention is directed to an optical receiver that may exhibit better tolerance to fiber dispersion. Other embodiments are also described.

BACKGROUND

Light waveguide data communications (also referred to here as optical data communications) is becoming increasingly popular due to its advantages in relation to systems that use conductive wires for transmission. Such advantages include resistance against radio frequency interference and higher data rates. An example of a light waveguide transmission system is an optical fiber cable link. Such links are widely used for high speed communications between computer systems. Each system that is attached to the link has a transmitter portion and a receiver portion. The transmitter portion includes electronic circuitry that controls a light source such as a laser, to generate a light signal in the cable that is modulated with information and/or data to be transmitted. The light signal is detected at the receiver portion by a light detector, such as a photodiode, and with the help of appropriate circuitry the received data is then demodulated and recovered.

Optical fiber cable causes dispersion in the light signal, making it difficult for the receiver to distinguish between adjacent data symbols in a received sequence. For example, chromatic dispersion penalties in the 1550 nanometer wavelength range are substantial above 10 gigabits/second, thereby limiting the reach of the optical link. To increase the optical reach, a technique known as duo-binary transmission is used which reduces transmission bandwidth relative to that of binary coded transmission, by encoding the transmitted data into three-level (ternary) symbols. Even where the data symbols are encoded using a binary scheme applying a duo-binary code at the receiver has been shown to provide a less drastic decrease in receiver sensitivity that results from chromatic dispersion. Techniques that further improve optical fiber dispersion tolerance at the receiver are still desirable.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Figure 1:
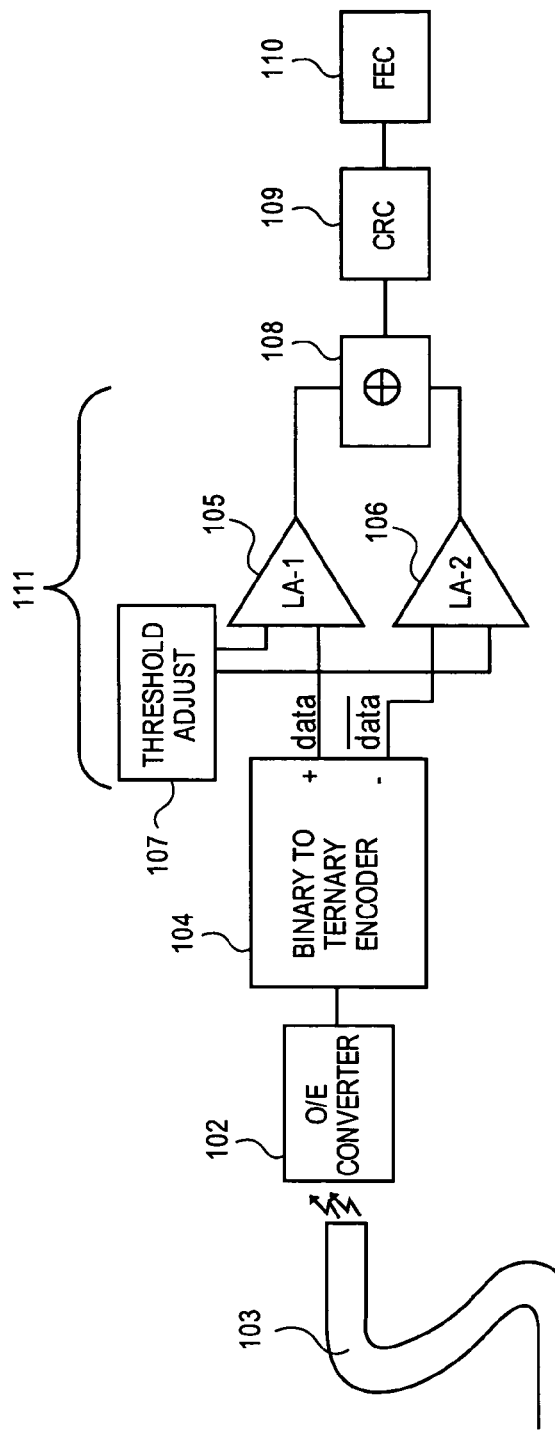
FIG. 1 is a conceptual block diagram of an optoelectronic circuit suitable for use in an optical receiver, in accordance with an embodiment of the invention, as shown.

An embodiment of the invention is a technique that may improve optical fiber dispersion tolerance for optical transmission at and beyond 10 gigabits/second data rate. FIG. 1 shows a block diagram of an optical receiver, in accordance with an embodiment of the invention. The receiver has an optical to electrical (O/E) converter 102 that is to be coupled to an optical waveguide 103 (e.g., optical fiber), to receive an incoming or input optical communications signal. The signal has propagated through the waveguide 103 from a transmitter (not shown, but see FIG. 4 for an example transmitter discussed below). The optical communication signal may be a binary, intensity modulated light signal. The O/E converter 102 may include a detector such as a photodiode whose output is a current signal. A binary to ternary encoder 104 (also referred to as an electric ternary encoder) encodes an input binary signal derived from the output of the O/E converter 102, into ternary (three level) format. In many instances, a transimpedance amplifier (not shown) is coupled between the converter 102 and the encoder 104 or may be part of the converter 102, to translate a binary electrical current signal that is produced by a photodiode, for example, into a pair of binary differential voltage signals (a binary signal and its complement). This type of differential treatment is indicated by the "+" and "−" outputs of the encoder 104 shown in FIG. 1.

In accordance with an embodiment of the invention, the receiver has a ternary to binary decoder (or simply ternary decoder) 111 that is relatively easy to implement and calibrate, and is effective with forward error correction (FEC). The ternary decoder 111 comprises a pair of limiting amplifiers (LAs) 105, 106 that are coupled in parallel to a differential output of the encoder 104 (or receive a pair of ternary differential voltage signals, data and data_bar). Each of the LAs 105, 106 has a pair of complementary inputs, where the normal or non-inverting input of each pair may be coupled to a respective output of the encoder 104 or receive the data and data_bar ternary voltage signals. The inverting inputs may be coupled to a threshold adjust circuit 107. Other polarity combinations are possible.

The threshold adjust circuit 107 sets an analog signal level or decision level that is compared to the ternary signal by each LA, to make a decision as to which symbol has been received. The output of each limiting amplifier is a binary sequence that is fed to a logical summing circuit 108. The summing circuit 108 may perform a modulo-2 addition upon the data values in its two input signals. The circuit 108 may be implemented using an exclusive-or (XOR) logic function. An output of the logical summing circuit 108 may then be fed to a clock recovery circuit (CRC) 109 which may retime the symbols that appear in the binary output of the summing circuit 108, in accordance with a clock that is extracted from its input signal. This clock had been transmitted by the transmitter over the waveguide 103. Also, at some point after the CRC 109, a FEC block 110 may be included, which performs error correction to reduce the need for retransmissions.

Figure 2:
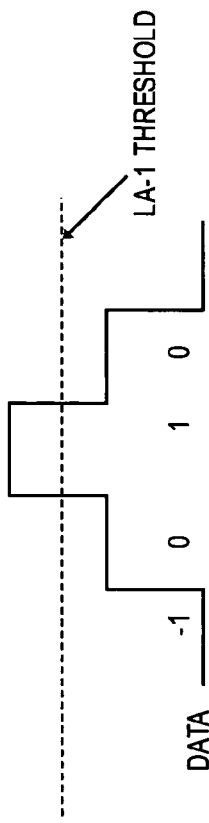
FIG. 2 illustrates example waveforms that are input to a ternary decoder in the receiver, that has a single threshold level for both top and bottom decision circuits.
Figure 2:
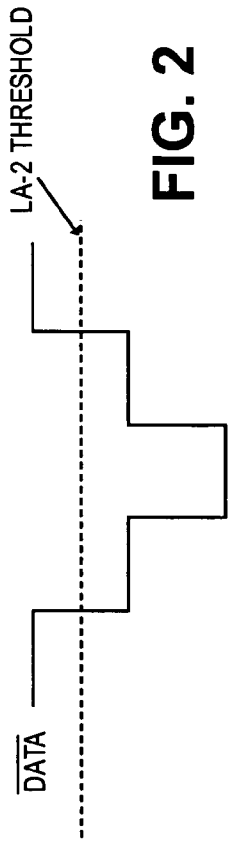

With the configuration of the ternary decoder 111 depicted in FIG. 1 in which there are a pair of parallel LAs 105, 106, a single DC offset or threshold signal level (a voltage signal, for example) can be applied as a reference (e.g., to the inverting inputs) of both LAs. This is sufficient to slice the decision level for both top and bottom ternary eyes. FIG. 2 illustrates this using an example waveform for data and data_bar at the output of the ternary encoder 104. Note that the thresholds for the two LAs, LA-1 and LA-2, are the same, DC level. The signals data and data_bar are each three-level signals (e.g., −1, 0, +1). An advantage of such a configuration for the ternary decoder is that it is a simple procedure for calibration and operation. In contrast, a conventional decoder that has two separately controlled top and bottom decision thresholds presents a relatively complicated maneuver for both calibration and operation. The single DC offset adjustment also allows for more efficient high volume manufacture. Moreover, such a decoder does not need a recovered clock. In other words, the LAs 105, 106 are clockless decision circuits, making the receiver as a whole more robotic for a wide range of different practical implementations of optical fiber links. Note that although a CRC 109 (e.g., in combination with a data recovery circuit) may be placed ahead of the encoder 104, such a solution may be easily plagued by chromatic dispersion in the waveguide 103, which closes the eye pattern of the binary signal at the output of the converter 102 relatively quickly, as the propagation distance over the waveguide 103 or the transmission bit rate increases.

Figure 4:
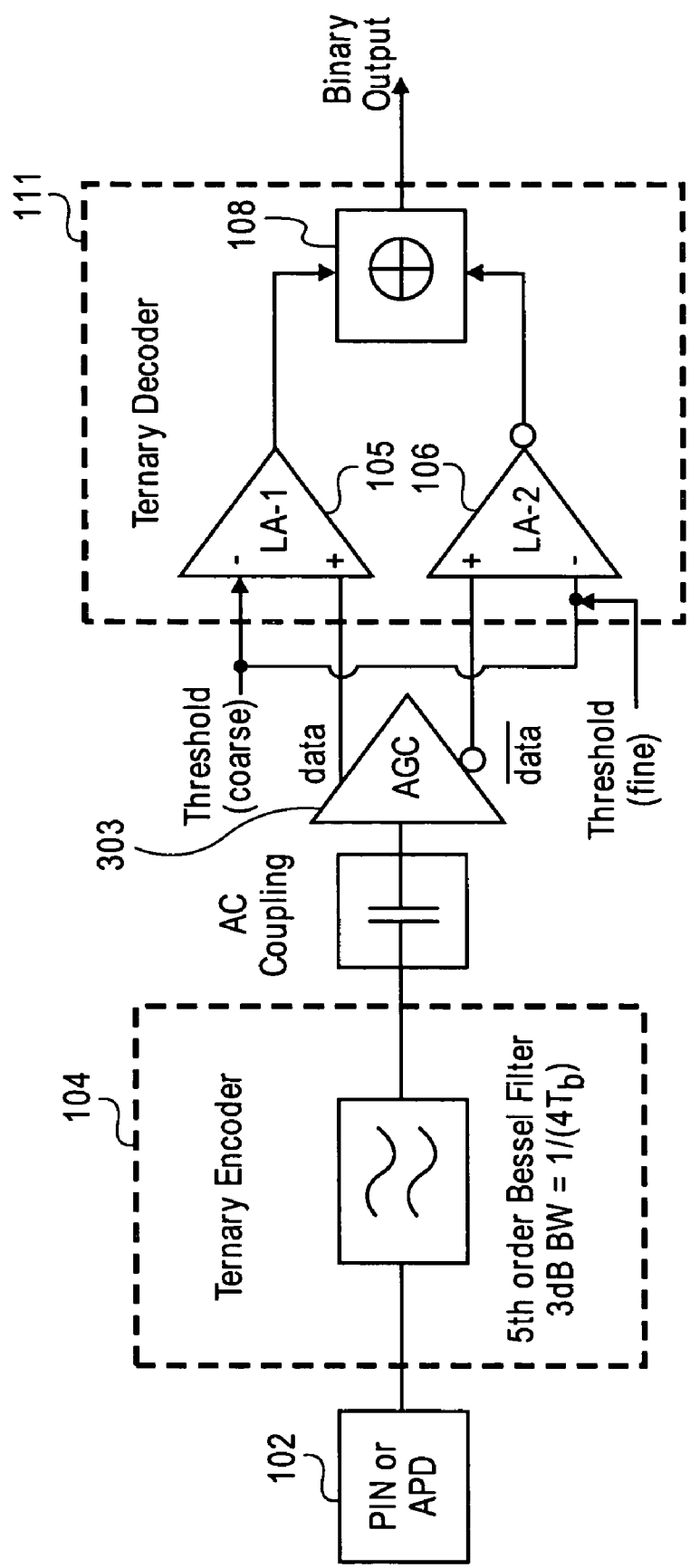
FIG. 4 is a circuit diagram of a receiver, in accordance with another embodiment of the invention.

To further optimize the decision making of the decoder 111, as the length of the waveguide 103 increases or as the optical signal to noise ratio changes, an additional DC voltage may be applied to the LA 106 (LA-2). This is depicted in FIG. 4 which shows another embodiment of the receiver, to be described further below. The additional threshold control provides additional freedom to address different eye openings between the top and bottom eyes. The top eye refers to the waveforms that are possible for the ternary data signal, whereas the bottom eye refers to the possible waveforms for the ternary data_bar. In this vein, additional threshold adjust circuitry can be provided to generate a threshold (coarse) signal and a separate threshold (fine) signal, which serve as the coarse and fine adjustments for the decision optimization, respectively. This is especially useful for a system that is equipped with the FEC block 110 (FIG. 1). The decision threshold can be optimized dynamically, by iterating threshold (coarse) first, and then threshold (fine) next, until corrections by the FEC block 110 are minimized.

Figure 3:
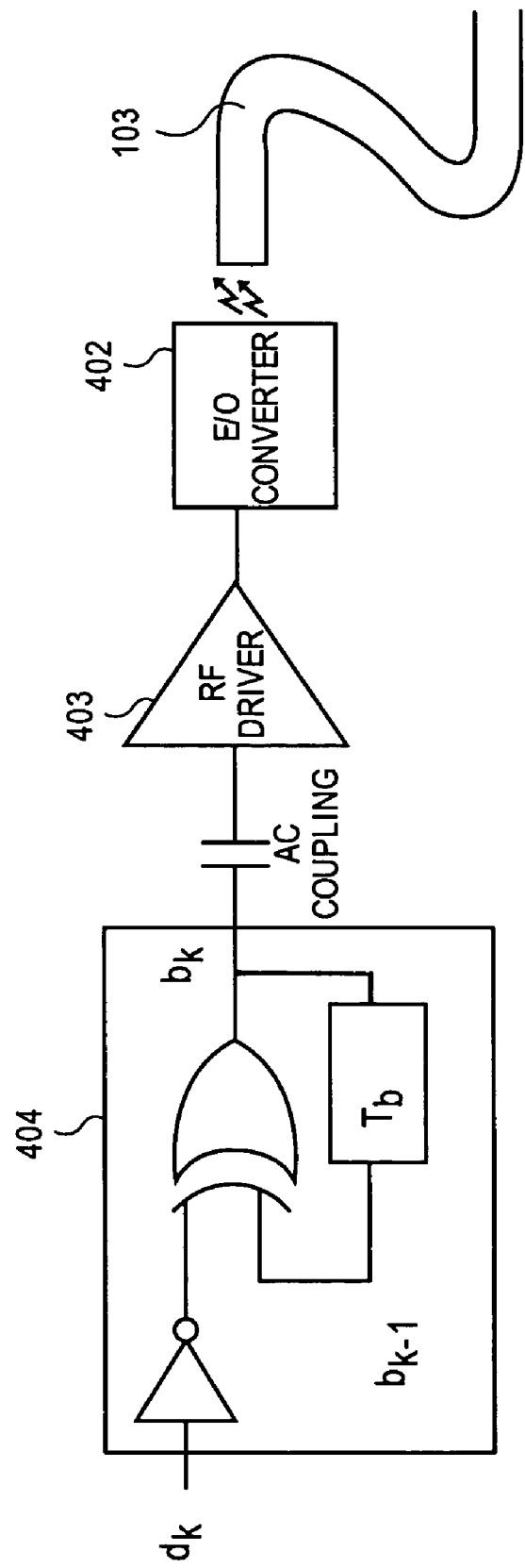
FIG. 3 is a logic diagram of an optical transmitter that may be used together with the circuit of FIG. 1 in an optical link.

FIG. 3 shows a suitable transmitter for the optical receiver. The transmitter has an electrical to optical (E/O) converter 104, which may be an electron absorptive modulator laser (EML) transmitter. The EML is driven by a radio frequency (RF) driver 403 whose input is AC coupled to a differential precoder 404 whose input is a pure random bit sequence dk. The differential precoder 404 helps prevent errors from cascading in the event a wrong decision is made at the receiver (by the decoder 111, see FIG. 1).

A simulation of the receiver was made using as the waveguide 103, a single mode optical fiber. With a conventional, binary NRZ receiver, the detected eye patterns were essentially closed after a link distance of 100 kilometers. However, using the receiver configuration shown in FIG. 4, which includes a ternary encoder 104 that comprises a fifth order Bessel filter having a 3-dB bandwidth of 3 GHz, the coded ternary eye (at the output of the encoder 104) opened up even after a simulated, 150 kilometers of fiber link. The O/E converter 102 in this case may be a PIN diode or an avalanche photodiode (APD), with a built-in transimpedance amplifier, to convert the received 10 gigabits/second, binary coded optical signal into a NRZ binary signal. Note that Tb refers to a bit period (bit cell) of data. The fifth order Bessel filter may be implemented digitally, by summation of the received binary bit sequence with 1-bit delayed data and a transverse filter. Other implementations for the ternary encoder 104 are possible.

In the embodiment of the invention depicted in FIG. 4, an automatic gain controlled (AGC) amplifier 303 has been added. The amplifier 303 has an input coupled to a single-ended output of the encoder 104 (via an AC coupling block). The clockless decision circuits, in this case the LAs 105, 106 have their respective normal or non-inverting inputs coupled to the complementary outputs of the AGC amplifier 303. This mechanism helps provide a constant amplitude at the inputs of the decoder 111 regardless of changes in the power levels of the binary coded optical signal received over the waveguide 103. In other words, if the optical signal becomes too strong, then the outputs of the AGC amplifier 303 are automatically adjusted (here, reduced) to compensate. As an alternative to the AGC amplifier 303 acting upon the normal inputs of the LAs 105, 106, a feedback compensation mechanism may be incorporated into the threshold adjust circuit 107 (see FIG. 1) to automatically adjust the limiting amplifier reference (threshold signal levels) instead, so as to compensate for fluctuations in the power of the optical signal.

Figure 5:
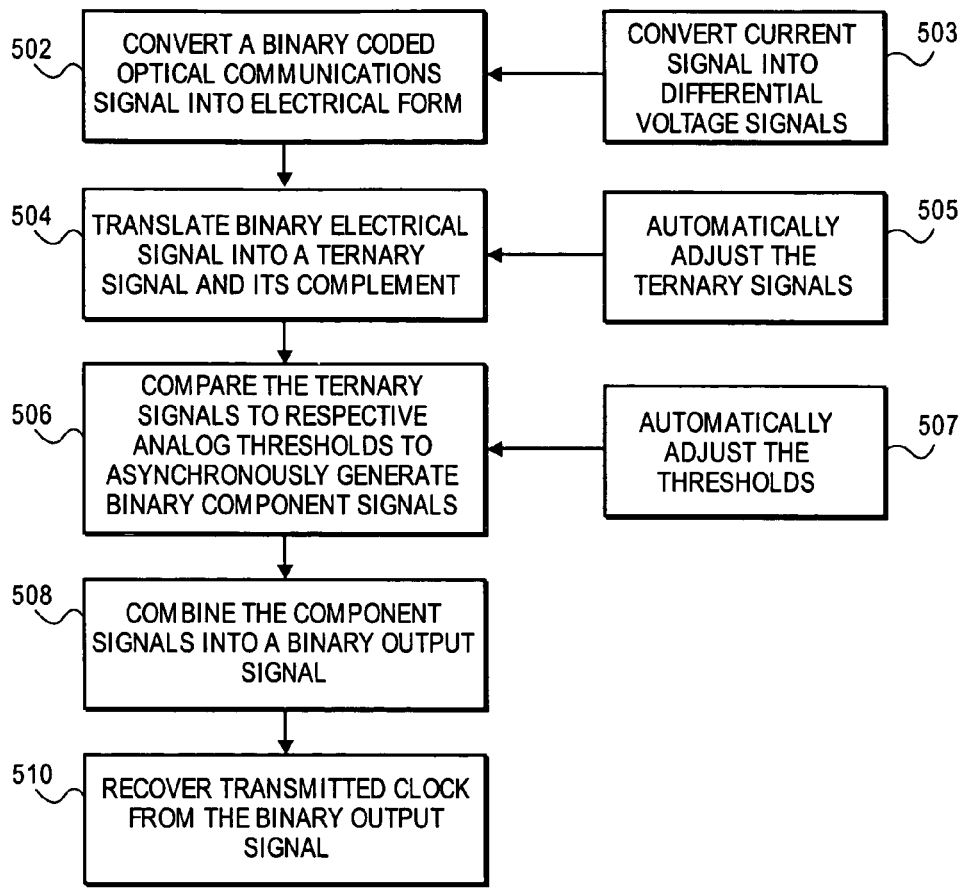
FIG. 5 is a flow diagram of operations in an optical receiver, in accordance with an embodiment of the invention.

Turning now to FIG. 5, a method for optical communications is described in flow diagram form, in accordance with an embodiment of the invention. This method may be performed by an optical receiver that is coupled to a waveguide to receive a binary coded optical communications signal. The method includes the following operations which although described sequentially need not all be performed one after the other. First, the binary coded optical communications signal is converted into electrical form (operation 502). This conversion may be performed by a PIN diode or an APD or another suitable photo detector.

The binary signal is translated into a ternary signal and its complement (operation 504). This may be done using a conventional, electric binary to ternary encoder and a suitable differential output stage that provides a differential output. The ternary signals are then compared to respective analog thresholds, to asynchronously generate binary component signals (operation 506). As described above, this may be done using dual limiting amplifiers without the assistance of a recovered clock (hence the ability to asynchronously generate the binary component signals). These binary component signals are then combined into a single binary output signal (operation 508). A transmitted clock may then be recovered from this binary output signal (operation 510).

Further aspects of the ternary decoder described above may also be incorporated into this process, including an automatic adjustment of the comparison threshold (operation 507). Another alternative is to convert the current signal from a photodiode into binary differential voltage signals which are then translated into a pair of ternary differential voltage signals, which are then compared to their respective analog thresholds (operation 503). FIG. 5 also shows the alternative to operation 507, namely automatically adjusting the ternary signals as opposed to adjusting the reference or threshold (operation 505). In some cases, the resulting binary electrical signal from the conversion operation is to be an NRZ OOK signal that is then subjected to the translation operation 504.

Figure 6:
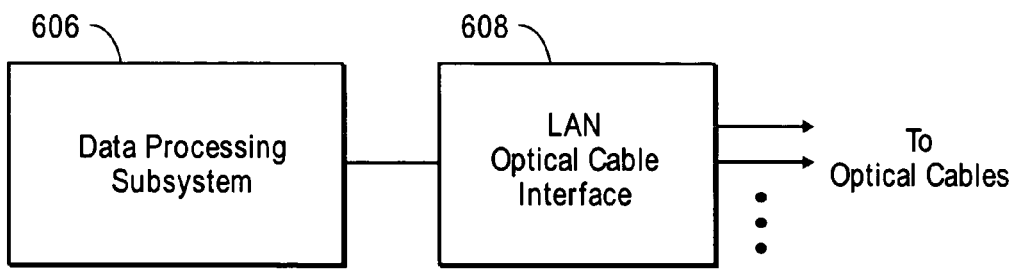
FIG. 6 is a block diagram of a data routing device with an optical receiver that is in accordance with an embodiment of the invention.

FIG. 6 shows a system application of the optical receiver described above, in the form of a data routing device. The data routing device may be a switch or a router that can process and forward data packets. As an alternative, the device may be one that passes time division multiplexed (TDM) signals. This device may be a carrier class Ethernet component that can receive and transmit at over 10 gigabits/second on a given port.

The data routing device has a data processing subsystem 606 that may have a CPU and memory that are programmed to process data traffic that is routed by the device. Incoming and outgoing data traffic are via optical cables (not shown) that are connected to a local area network (LAN) or long haul optical cable interface 608 of the routing device. The interface 608 may be designed for LAN optical cables which may be used in short distance optical links, or for long distance or long-haul optical cables such as those typically used by telecommunication companies and long-haul fiber optic networks. The interface 608 may include discrete optical subassemblies or transceiver packages in which the optical receiver is integrated. The transceiver may be a pluggable, XFP module. In addition, the interface 608 may also include an integrated, optical cable connector (that mates with one attached to the optical cable). Also, serializer-deserializer circuitry may be provided that serializes packets from the data processing subsystem 606 for transmission, and deserializes a received bit stream from the optical cables into, for example, multiple byte words in the format of the data processing subsystem 606. The data processing subsystem 606 operates on such packets to determine, for example, a destination node to which the packet will be forwarded, using a routing algorithm, for example, and/or a routing table.

Other system applications of the optical receiver include optical links that are within a computer system enclosure (e.g., a computing or telecommunications rack or chassis in which a number of server blades are to communicate with each other as part of a local area network, for example). Yet another system application is to incorporate the optical receiver as part of either an optical chip-to-chip interconnect or, alternatively, an optical on-chip interconnect.

The invention is not limited to the specific embodiments described above. For example, although the precoder 404 is depicted as part of the transmitter in FIG. 3, the precoder can alternatively be placed at the receiver (FIGS. 1 and 4 after the O/E converter 102). Accordingly, other embodiments are within the scope of the claims.

What is claimed is:

1. An optoelectronic circuit comprising:
    an optical to electrical converter to receive an incoming optical data communications signal;
    a binary to ternary encoder having an input coupled to an output of the converter;
    a ternary to binary decoder having first and second limiting amplifiers (LAs) each having a pair of complementary inputs, one of the complementary inputs of each pair being coupled to a first adjustable threshold circuit and the other being coupled to an output of the encoder, the first adjustable threshold circuit to provide a coarse adjustment to the threshold signal levels at the inputs of the first and second LAs, and a second adjustable threshold circuit to provide a fine adjustment to the threshold signal level at one of the inputs of the first and second LAs; and
    a logical summing circuit having a first input coupled to an output of the first LA and a second input coupled to an output of the second LA.

2. The optoelectronic circuit of claim 1 further comprising a clock recovery circuit having an input coupled to an output of the logical summing circuit.

3. The optoelectroruc circuit of claim 1 further comprising a transimpedance amplifier coupled between the converter and the binary to ternary encoder.

4. The optoelectronic circuit of claim 1 further comprising:
    an automatic gain control (AGC) circuit having an input coupled to the output of the encoder, wherein the ternary to binary decoder has first and second inputs coupled to respective complementary outputs of the AGC circuit.

5. The optoelectronic circuit of claim 1 wherein the first adjustable threshold circuit provides the same adjustable threshold signal level to the first and second LAs.

* * * * *

UNITED STATES PATENT AND TRADEMARK OFFICE
CERTIFICATE OF CORRECTION

| | | |
|---|---|---|
| PATENT NO. | : 7,587,145 B2 | Page 1 of 1 |
| APPLICATION NO. | : 11/479996 | |
| DATED | : September 8, 2009 | |
| INVENTOR(S) | : Shang et al. | |

It is certified that error appears in the above-identified patent and that said Letters Patent is hereby corrected as shown below:

In column 6, at line 20 delete, "optoelectroruc" and insert --optoelectronic--.

Signed and Sealed this

Fifteenth Day of June, 2010

David J. Kappos
*Director of the United States Patent and Trademark Office*